March 4, 1941.  J. R. DARBY  2,233,809
CINEMATOGRAPHIC APPARATUS
Filed Jan. 31, 1939
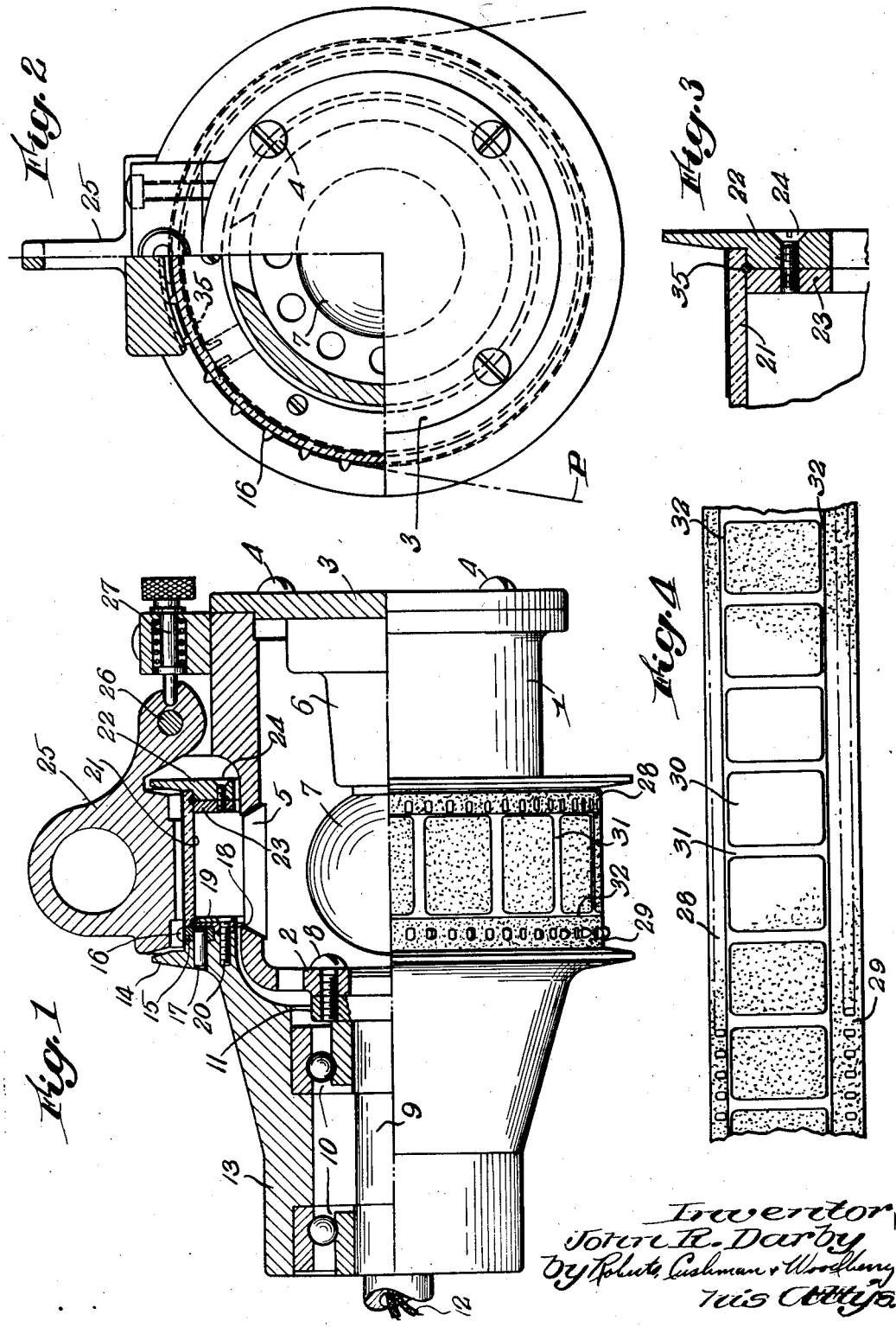

Patented Mar. 4, 1941

2,233,809

UNITED STATES PATENT OFFICE 2,233,809

CINEMATOGRAPHIC APPARATUS

John R. Darby, Pasadena, Calif., assignor to Technicolor Motion Picture Corporation, Los Angeles, Calif., a corporation of Maine.

Application January 31, 1939, Serial No. 253,786

2 Claims. (Cl. 95—75)

In printing motion picture film it is customary to form an opaque border around each picture area of the printed film so that all picture areas are exactly the same in size and each picture is sharply and evenly bounded. Heretofore it has been proposed to print the aforesaid borders in two operations in successive printers, a cycle-line printer for printing a straight line of uniform width along each side of the row of picture areas and a frame-line printer for printing the cross lines between the picture areas, the frame lines bridging the space between the cycle lines so that the two sets of lines together completely bound each picture area.

Objects of the present invention are to provide a printer which will print both cycle lines and frame lines in a single operation, which can readily be adjusted to vary the width and/or spacing of the cycle and/or frame lines, and which is generally superior to prior printers of the character referred to.

In one aspect the present invention involves a wheel (or drum) with a circumferential transparent portion whose effective width is at least equal to the distance between the outside edges of the widest cycle lines to be printed, together with a light-source inside the wheel and any means for obstructing the passage of light from said source to film feeding over the wheel except to those portions of the film bordering the picture areas of the film, thereby to print on the film cycle and/or frame lines. Preferably the film wheel comprises a rotary hub and a transparent ring in telescopic engagement with each other, together with means for holding the ring on the hub. Another hub may be provided at the other end of the transparent ring and one or both hubs may be provided with sprocket teeth. In this aspect of the invention the passage of light through certain areas of the transparent ring may be obstructed in any suitable way as by incorporating coloring matter in and/or on certain portions of the ring.

In another aspect the invention involves an opaque film having transparent cycle and frame lines for use in printing the aforesaid border lines on another film in a single operation. Preferably the opaque film is an endless film formed by splicing together the ends of a strip of film long enough to extend around the aforesaid transparent ring.

Other aspects of the invention will be evident from the preferred embodiment shown in the accompanying drawing in which Fig. 1 is a side view partly in elevation and partly in section;

Fig. 2 is an end view partly in elevation and partly in section;

Fig. 3 is an enlarged detailed section corresponding to Fig. 1; and

Fig. 4 is a plan view of a section of the printing film.

The particular embodiment of the invention chosen for the purpose of illustration comprises a lamp housing having a cylindrical portion 1, an integral end portion 2 and an end cover 3 held in place by screws 4. The upper side of the cylindrical portion of the lamp housing contains a window 5 and the removable end 3 carries a lamp socket 6 for supporting a lamp 7 in alignment with the window 5. The lamp housing is mounted by means of screws 8 on the end of a tubular member 9 having enlarged portions to fit into the ball bearings 10 and having an enlarged end 11 to receive the screws 8. The projecting end of the tubular member 9 may be mounted on any suitable support and the wires for the lamp 7 may lead through the tubular member as shown at 12.

Rotatably mounted on the ball bearings 10 is a hub 13 having an integral film guiding flange 14 and carrying a ring 15 provided with sprocket teeth 16. The ring 15 is held in position by a dowel 17 and retainer plates 18 and 19 secured in position by means of screws 20. Telescoping over the rings 18 and 19 of the hub 13 is a transparent ring 21 formed of glass or other transparent material. Telescoping into the right-hand end of the ring 21 is another hub comprising a flange ring 22 and a smaller ring 23 secured together by screws 24. The transparent ring 21 is secured in telescopic relationship to the hubs by means of wire rings 35 fitting into annular recesses in the inner periphery of the ring 21 and the outer peripheries of the two hubs. The groove in the left-hand hub is located between the rings 18 and 19 and the groove in the right-hand hub is located between the rings 22 and 23. Thus by removing the screws 20 and 24 the rings may be removed, it being understood that these rings are split so as to snap into the annular grooves in the inner periphery of the transparent ring 21. Above the window 5 a pressure shoe 25 is pivoted at 26 with spring detent 27 to hold the shoe in operating position.

As shown in Fig. 4 the aforesaid opaque printing film comprises opaque marginal portions 28 and 29, and opaque rectangles 30 corresponding to the picture areas of the film to be printed. Extending crosswise of the film between the rectangles 30 are transparent lines 31 corresponding to the frame lines of the film to be printed, and extending longitudinally of the film along each side of the row of picture areas are the transparent lines 32 corresponding to the cycle lines of the film to be printed. As shown in Figs. 1 and 2 the printing film is an endless film fitting around the transparent ring 21 with the sprocket teeth 16 extending through the sprocket holes in the left-hand margin of the film (Fig. 1). The film P to be printed is fed over the sprocket wheel as shown in Fig. 2, the film preferably being fed continuously and rotating the wheel 13 as the film is pulled through the machine.

By replacing the film 28—32 with another film having cycle and/or frame lines of different width and/or spacing the printer may readily be adjusted to print cycle and/or frame lines of any desired kind.

It should be understood that the present disclosure is for the purpose of illustration only and that this invention includes all modifications and equivalents which fall within scope of the appended claims.

I claim:

1. Apparatus for printing border lines on motion picture film, comprising an endless opaque film having transparent lines corresponding to said border lines, a circular housing having a light aperture in its periphery, a rotor having a transparent drum surrounding said housing for feeding said endless film and picture film in superposition past said aperture with the endless film surrounding the drum, said rotor having teeth fitting into openings in both films as the films pass the aperture to hold the films in register, whereby the picture film may be continuously printed with border lines bearing the same relation to the openings therein as said transparent lines bear to the openings in the endless film.

2. Apparatus for printing motion picture film comprising a rotary hub carrying an annular row of sprocket teeth for engagement in the sprocket holes along one margin of motion picture film, a transparent cylinder projecting coaxially from said hub for supporting the central picture zone of the film, means for detachably mounting one end of the transparent cylinder on said hub in the aforesaid coaxial relationship, a lamp housing having a part disposed within the transparent cylinder, and means at the other end of said cylinder for replacing a lamp in said housing.

JOHN R. DARBY.